United States Patent [19]

Rasshofer et al.

[11] Patent Number: 4,500,656
[45] Date of Patent: Feb. 19, 1985

[54] PROCESS FOR THE PREPARATION OF A CELLULAR POLYURETHANE

[75] Inventors: Werner Rasshofer, Cologne; Ernst-Christoph Prolingheuer, Herne, both of Fed. Rep. of Germany

[73] Assignee: Bayer Aktiengesellschaft, Leverkusen, Fed. Rep. of Germany

[21] Appl. No.: 594,054

[22] Filed: Mar. 28, 1984

[30] Foreign Application Priority Data

Apr. 5, 1983 [DE] Fed. Rep. of Germany ....... 3312215

[51] Int. Cl.³ ..................... C08G 18/14; C08G 18/32
[52] U.S. Cl. ..................................... 521/164; 521/904
[58] Field of Search ................................ 521/164, 904

[56] References Cited

U.S. PATENT DOCUMENTS

| | | | |
|---|---|---|---|
| 2,343,808 | 3/1944 | Schlack | 528/85 |
| 3,261,813 | 7/1966 | Ramos | 528/63 |
| 3,391,091 | 7/1968 | Considine et al. | 528/58 |
| 3,425,964 | 2/1969 | Stanley | 260/77.5 AM |
| 3,511,814 | 5/1970 | Ogura et al. | 260/501.2 |
| 4,077,920 | 3/1978 | Yukuta et al. | 521/117 |
| 4,136,241 | 1/1979 | Ammann | 521/163 |

FOREIGN PATENT DOCUMENTS

| | | |
|---|---|---|
| 1570571 | 7/1969 | Fed. Rep. of Germany . |
| 2200480 | 7/1972 | Fed. Rep. of Germany . |
| 1103506 | 2/1968 | United Kingdom . |

OTHER PUBLICATIONS

Smola, Chem. Abs. 43 (1949) 6157h.
"Polyurethane–Chemistry and Technology", Part II, Saunders and Frisch, Interscience Publishers, pp. 228–239 (1964).
A. Smola, Mitteilungen des Chemischen Forschungsinstituts der Wirtschaft Osterreichs 2, 38–40 and 43–45 (1948).
Chemical Abstracts 43 (1949), 6157h.

*Primary Examiner*—Herbert S. Cockeram
*Attorney, Agent, or Firm*—Gene Harsh; Joseph C. Gil; Thomas W. Roy

[57] ABSTRACT

The present invention relates to a process for the preparation of a cellular polyurethane by the reaction of
(A) a polyisocyanate with
(B) an isocyanate reactive component containing
  (1) at least one component having a molecular weight of about 60–2000 and a functionality of 2 to 8, containing isocyanate reactive groups,
  (2) optionally at least one component having a molecular weight of about 2000 to 12,000 and a functionality of 2 to 8 containing isocyanate reactive groups.
  (3) about 0.1 to 30 parts, based on 100 parts of (B1)+(B2), of a liquid adduct of an amine and carbon dioxide, and
  (4) optionally water, blowing agents, foam stabilizers, catalysts and other auxiliary agents and additives, characterized in that the liquid adduct of amine and carbon dioxide is liquid at 20° C., optionally contains water, and is an adduct of carbon dioxide and an amine having at least one amino group and containing at least one primary, secondary or tertiary hydroxyl group, which amine may be solid or liquid at 20° C.

12 Claims, No Drawings

PROCESS FOR THE PREPARATION OF A CELLULAR POLYURETHANE

BACKGROUND OF THE INVENTION

1. Field of the Invention

This invention relates to a process for the preparation of cellular polyurethanes, using liquid adducts of mono- or polyamines containing one or more hydroxyl groups and carbon dioxide, in particular with the addition of liquid carbonic acid salts of such hydroxyl group-containing mono- or polyamines.

2. Description of the Invention

The use of carbon dioxide addition products of hydroxyl group containing amines (hereinafter called: hydroxylic amines) for the preparation of polyurethanes is known per se and the use of ethanolamine carbamate in a process for the production of a cellular polyurethane elastomer is mentioned in DE-OS 2 200 480, but this prior publication does not disclose whether the ethanolamine carbamate is in the solid or liquid state. DE-PS 2 621 582, however, reveals that carbamates which are reaction products of primary or secondary amines containing one or two hydroxyl groups and carbon dioxide are solid and are obtained in the solid state if they are prepared by introducing carbon dioxide in an alcohol or other solvent, and cannot form a homogeneous, monophasic mixture with a polyol. The last mentioned prior publication does not disclose that the carbon dioxide addition products in question are liquid at room temperature or that they can be obtained as liquids.

It is known from DE-OS 1 570 571 that liquid carbamates of compounds containing amino groups do exist. The amines mentioned in the said prior publication are, however, limited to diamines or polyamines containing ether groups, wherein from 0.1 to 50% of the amino groups may be replaced by hydroxyl groups. In this reference it is preferred, however, to use high molecular weight or relatively high molecular weight amines generally having only a low basic nitrogen content and with the amino groups frequently attached to secondary carbon atoms, so that the amount of carbon dioxide taken up is low.

The use of products according to DE-OS 2 200 480 and DE-PS 2 621 582 for the production of polyurethane foams is also known.

The state of the art therefore does not provide the man of the art with the possibility of using liquid, low viscosity carbon dioxide adducts of hydroxyl group-containing mono- or polyamines with a high amine and carbon dioxide content for the production of polyurethane foams, and in particular, no homogeneous, optically clear, monophasic, stable mixtures of such carbon dioxide adducts and polyols containing at least two isocyanate reactive hydrogen atoms are known.

It has now surprisingly been found that carbon dioxide adducts of mono- or polyamines containing one or more hydroxyl groups, in which the amino groups may be primary and/or secondary and possibly also tertiary and may be substituents on or chain members in acyclic or cyclic aliphatic compounds are obtained in a liquid form and remain liquid without crystallization if they are prepared by addition of the hydroxyl-containing amines to carbon dioxide and optionally water, and that the adducts prepared by this method are homogeneously soluble in the polyols conventionally used for the preparation of polyurethanes, in particular polyols having a functionality of $\geq 2$ and a molecular weight of from about 60 to 200.

In particular, it has also surprisingly been found that not only carbamates, which are ammonium salts of alkyl carbamic acids, but also salts of carbonic acid with these polyamines containing hydroxyl groups, which salts are obtained by carrying out the reaction of the amines with carbon dioxide in the presence of water, and the mixtures of salts of the carbamic acids and carbonic acid, are liquid. The differences between carbamates as salts of carbamic acid and carbonates or bicarbonates as salts of carbonic acid are well known to the man of the art and have been described, for example, in A. Smola, Mitteilungen des Chemischen Forschungsinstituts der Wirtschaft Österreichs 2, 38–40 and 43–45 (1948) (Chemical Abstracts 43 (1949), 6157 h).

The fact that liquid carbonic acid salts of amines containing hydroxyl groups are now available also makes it possible to overcome the disadvantages of the carbamates of such hydroxyl group-containing amino compounds known in the art. Thus it is mentioned in DE-PS 2 621 582 that amino carbamates of the aforesaid "amines are generally hygroscopic" and that "the aminocarbamate which has been synthesized separately, isolated and purified is difficult to store in the form of a fine powder" and that there is "insufficient dispersion in the polyol".

DE-OS 2 200 480 teaches that the aminocarbamates are generally no longer heat stable at temperatures from about 35° C. and decompose at such temperatures. A similar teaching is given in DE-OS 1 570 571, according to which conversion of the amines into carbamates by reaction with $CO_2$ can only be carried out at temperatures of from −40° C. to 40° C., preferably from 0° C. to 20° C. The carbamates prepared by way of example in this prior publication for the most part already decompose at room temperature or at 30° C.

The liquid carbon dioxide adducts according to the present invention, on the other hand, are surprisingly stable. They are prepared at temperatures of up to 80°–90° C. or even higher and vigorous uptake of carbon dioxide in some cases only begins at this temperature. The hygroscopic character mentioned in the prior publication as a disadvantage of the crystalline carbamates of the hydroxyl-containing amines is now of no importance since the (hydrogen) carbonates which are assumed to be formed from the carbamates by uptake of water are in any case liquid and suitable for the preparation of cellular polyurethanes. Moreover, the liquid carbamates according to this invention were not observed to have any pronounced tendency to absorb water. The carbamates and (hydrogen) carbonates according to the invention could also be subjected to prolonged heating to temperatures up to 100° C., e.g. 50° C., and could be subjected to a vacuum at room temperature, e.g. of 20 mbar, without any evolution of carbon dioxide or loss of water being observed.

Liquid carbamates and (hydrogen) carbonates of hydroxyl group-containing amines, in particular (hydrogen) carbonates having such properties could not be inferred from the published state of the art, nor could their use in a process for the production of foamed polyurethane and/or polyurea resins, in which, by virtue of their stability, solubility and liquid aggregate state, they are more easily worked up than the carbamates and carbonates known in the art.

SUMMARY OF THE INVENTION

The present invention relates to a process for the preparation of a cellular polyurethane by the reaction of
(A) a polyisocyanate with
(B) an isocyanate reactive component containing
  (1) at least one component having a molecular weight of about 60–2000 and a functionality of 2 to 8, containing isocyanate reactive groups,
  (2) optionally at least one component having a molecular weight of about 2000 to 12,000 and a functionality of 2 to 8 containing isocyanate reactive groups,
  (3) about 0.1 to 30 parts, based on 100 parts of (B1)+(B2), of a liquid adduct of an amine and carbon dioxide, and
  (4) optionally water, blowing agents, foam stabilizers, catalysts and other auxiliary agents and additives,
characterized in that the liquid adduct of amine and carbon dioxide is liquid at 20° C., optionally contains water, and is an adduct of carbon dioxide and an amine having at least one amino group and containing at least one primary, secondary or tertiary hydroxyl group, which amine may be solid or liquid at 20° C.

DETAILED DESCRIPTION OF THE INVENTION

In a preferred process according to the invention, the liquid adduct of amine and carbon dioxide has been obtained by the action of carbon dioxide on the amine, optionally in the presence of water but in the absence of solvents of the type of aliphatic (halogenated) hydrocarbons, optionally nitrated or halogenated aromatic hydrocarbons optionally carrying alkyl groups, lower aliphatic alcohols, acid amides, lactams and aprotic-polar solvents (e.g. ketones, ethers, nitriles, N-substituted acid amides or N-substituted lactams), at temperatures of from about −25° C. to 160° C., preferably from 0° C. to 130° C., most preferably from 15° C. to 100° C. On the other hand, polyols with an OH number above 112 containing 2–8 hydroxyl groups may be used as solvents but it is most particularly preferred not to use solvents.

In another process which is preferred according to the invention, the liquid adduct of amine and carbon dioxide has
(a) a basic nitrogen content of about 19 to about 3.5% by weight,
(b) a hydroxyl group content of about 27.5 to about 8.5% by weight,
(c) a carbon dioxide content of about 42 to 1.0% by weight and
(d) a water content from 0 to about 15% by weight.

Another preferred process according to the invention is characterized in that the liquid adduct of amine and carbon dioxide is a carbonate and/or bicarbonate, which is liquid at 20° C., of an amine having at least one primary, secondary or tertiary amino group and containing at least one primary, secondary or tertiary hydroxyl group, which amine may be solid or liquid at 20° C., and in that it has
(a) a basic nitrogen content of about 17 to about 3.5%
(b) a hydroxyl group content of about 20.5 to about 8.5%,
(c) a carbon dioxide content of about 36% to about 2.5% by weight, and
(d) a water content of about 3 to about 15% by weight.

Liquid carbonates and/or bicarbonates of N-mono-, N,N-di- and N,N,N-tri-($\beta$-hydroxyalkyl)amines and of N-mono-, N,N'-di- and N,N',N'-tri-($\beta$-hydroxyalkyl)ethylenediamine are preferred, in particular those of ethanolamine, diethanolamine, propanolamine, isopropanolamine, diisopropanolamine and N-hydroxyethyl ethylenediamine.

The following are compounds having at least one primary, secondary or tertiary hydroxyl group and at least one primary, secondary and optionally tertiary amino group which may be used for the preparation of the carbon dioxide adducts (B3):

Monoamino-mono- or -dihydroxy compounds (having primary or secondary amino groups), e.g. 2-aminoethanol, 2-methyl-2-aminoethanol, 2-ethyl-2-aminoethanol, 6-hydroxyhexylamine; bis-hydroxyalkyl derivatives of primary amines, e.g. bis-$\beta$-hydroxyethylamine, bis-($\beta$-hydroxypropyl)-amine, and N,N,N'-tris-($\beta$-hydroxypropyl)-ethylene diamine; also compounds such as 3-aminomethyl-3,5,5-trimethylcyclohexanol, 2-amino-2-hydroxymethyl-1,3-propanediol, 2-amino-2-methyl-1,3-propanediol or 2-amino-2-methyl-propanol.

Also monoalkoxylated diamines derived from aliphatic straight chained or branch chained diamines, preferably having 2 to 12 carbon atoms, or cycloaliphatic diamines of the cyclohexane, dicyclohexyl, dicyclohexylmethane, dicyclohexyl-2,2-propane or dicyclohexyl-1,1-cyclohexane series optionally substituted with alkyl groups, and alkylene oxides such as ethylene oxide, propylene oxide, butylene-2,3-oxide as well as styrene oxide. Monoalkoxylated aliphatic diamines having 2 to 6 carbon atoms and in some cases also cycloaliphatic diamines which have been alkoxylated with ethylene oxide or propylene oxide are preferred. The following are examples: N-($\beta$-hydroxyethyl)-ethylenediamine, N-($\beta$-hydroxyethyl)-propylenediamine-(1,2), N-($\beta$-hydroxyethyl)-propanediamine-(1,3), N-($\beta$-hydroxyethyl)-hexanediamine-(1,6), N-($\beta$-hydroxyethyl)-dodecanediamine-(1,12), N-($\beta$-hydroxypropyl)-ethylenediamine, N-($\beta$-hydroxypropyl)-propylenediamine-(1,2), N-($\beta$-hydroxypropyl)-propanediamine-(1,3), N-($\beta$-hydroxypropyl)-butanediamine-(1,4), N-($\beta$-hydroxybutyl)-ethylenediamine, N-($\beta$-hydroxybutyl)-hexanediamine-(1,6), N-($\beta$-hydroxyethyl)-xylylenediamine-(1,3), N-($\beta$-hydroxyethyl)-cyclohexanediamine-(1,3) or -(1,4), N-($\beta$-hydroxyethyl)-2,2,4-trimethylhexane diamine-(1,6), 1-methyl-2-amino-4-[N-(2-hydroxyethyl)-amino]-cyclohexane, N-($\beta$-hydroxyethyl)-isophorone diamine, N-($\beta$-hydroxyethyl)-4-aza-4-methyl-heptanediamine-(1,7). Bis-(hydroxyalkyl)-diamines which have been obtained from the corresponding straight chained or branched chained aliphatic or cycloaliphatic diamines by alkoxylation with alkylene oxides are also suitable, particularly those obtained by alkoxylation with ethylene oxide and/or propylene oxide. The following are examples: N,N'-bis-($\beta$-hydroxyethyl)-ethylenediamine, N,N'-bis-($\beta$-hydroxypropyl)-ethylenediamine, N,N'-bis-($\beta$-hydroxyethyl)-propylene diamine-(1,2), N,N'-bis-($\beta$-hydroxypropyl)-propanediamine-(1,3), N,N'-bis-($\beta$-hydroxyethyl)-1-methyl-2,4- and -2,6-diaminocyclohexane, N,N'-bis-($\beta$-hydroxypropyl)-1-methyl-2,6- and -2,4-diaminocyclohexane, N,N'-bis-($\beta$-hydroxyethyl)-isophoronediamine, N,N'-bis-($\beta$-hydroxypropyl)-p-xylylene diamine, and N-($\beta$-hydroxyethyl)-N'-($\beta$-hydroxypropyl)-ethylenediamine. Alkoxylated triamines and polyamines may also be used, e.g. tris-($\beta$-hydroxyethyl)-1,6,11-triaminoundecane. Mixtures of compounds in various stages of alkoxylation may also be used, e.g. mixtures of mono-, bis- and tris-hydroxyethyl-ethylenediamine or mixtures of mono- and diethanolamine.

Compounds such as 1,3-diamino-propanol-2; 1,6-diamino-hexanol-2; 1,5-diaminopentanol-3; 3,4-diamino-2,2-dimethyl-butanol-1; diaminocyclohexanols and 1,11-diaminoundecanol-6 may also be used.

Other suitable compounds include β-hydroxyethyl hydrazine and β-hydroxypropylhydrazine.

Also suitable for the preparation of carbonic acid adducts (but not for the preparation of the carbamates) are compounds containing at least one but preferably several hydroxyl groups and at least one tertiary amino group. These include, for example, triethanolamine, tris-(β-hydroxypropyl)-amine, 6-methyl-3-oxa-6-azaheptanol, tetra-(β-hydroxyethyl)-ethylenediamine, tetra-(β-hydroxypropyl)-ethylenediamine, tetra-(β-hydroxyethyl)-isophoronediamine, bis-(β-hydroxyethyl)-methylamine, bis-(β-hydroxyethyl)-butylamine, bis-(β-hydroxypropyl)-ethylamine, bis-(β-hydroxypropyl)-methylamine, bis-(β-hydroxypropyl)-hexylamine and bis-(β-hydroxyethyl)-oleylamine.

Preferred for the preparation of the carbon dioxide adducts are those amine compounds which may be thought of as being obtained by the reaction of 1 to 2 mols of ethylene oxide and/or propylene oxide with ammonia or the reaction of 1 to 3 mols of ethylene oxide and/or propylene oxide with ethylenediamine.

These amines containing hydroxyl groups are converted into carbon dioxide adducts by a reaction with carbon dioxide. If no water is used in the reaction, so-called carbamates are formed, which constitute ammonium salts of alkylcarbamic acids. If water is used in stoichiometric or even larger quantities (based on the amine), carbonic acid salts of the corresponding amino compounds are obtained. If a quantity of water less than that required for complete formation of the carbonic acid salt is used, the corresponding mixtures of carbamates and (hydrogen) carbonates are obtained. Water may, of course, also be used in a larger than the stoichiometric quantity required for formation of the carbonic acid salt. The reaction is carried out at temperatures in the range of from about $-25°$ C. to $160°$ C., preferably from about $0°$ C. to $130°$ C., most preferably from about $15°$ C. to $100°$ C., without any solvents of the type of aliphatic (halogenated) hydrocarbons, optionally nitrated or halogenated aromatic hydrocarbons optionally containing alkyl groups, lower aliphatic alcohols, aprotic polar solvents, acid amides or lactams. Polyols with an OH number above 112 containing 2 to 8 hydroxyl groups may, however, be used as solvents although it is preferred to carry out the reaction without solvents.

The adducts (B3) are put into the process in a quantity of from about 0.1 to 30 parts, preferably from about 0.15 to 15 parts, most preferably from about 0.2 to 2.99 parts, based on 100 parts of (B1)+(B2).

Preparation of the adducts may be carried out with any form of carbon dioxide, preferably with unpurified carbon dioxide from steel cylinders, and it may be carried out at subatmospheric or excess pressure but preferably at normal pressure. The temperatures at which the preparation is carried out generally range from about $-25°$ C. to the boiling point of the amine used if this is below $200°$ C. at normal pressure, otherwise to about $160°$ C. A narrower, preferred range is from about $0°$ C. to $130°$ C., and from about $15°$ C. to $100°$ C. is particularly preferred. The process is preferably carried out by introducing a vigorous stream of carbon dioxide into the amine which has been previously introduced into a suitable stirrer vessel, optionally with a suitable quantity of water, without cooling or external heating. The reaction, which in most cases sets in immediately with vigorous evolution of heat, rapidly raises the temperature of the mixture to about $40°–130°$ C.

A marked fall in temperature occurs towards the end of the reaction. If the reaction temperature rises rapidly due to the exothermic reaction, e.g. to $100°$ C., external cooling is preferably applied to prevent the side reactions (e.g. ring formation) and discolorations which occur if the temperatures are too high.

If desired, the amine or mixture of amine and water may from the start be heated to an elevated temperature before the $CO_2$ is introduced. No advantages are obtained by maintaining the reaction temperatures within the range of from $-40°$ C. to $40°$ C. although this is possible, as described in DE-OS 1 570 571. In many cases, it is even advisable to employ elevated temperatures in order to make the mixture more easily stirrable.

What has been said above concerning the heat of reaction produced and the limits of reaction temperature to be maintained applies both to the preparation of the carbamates and to the preparation of the carbonic acid salts, but in the case of the latter it should be remembered that the bringing together of amine and water is in itself sufficient to release a considerable quantity of heat. The temperatures occurring with the introduction of carbon dioxide are on average below those produced in the preparation of the carbamates.

The carbon dioxide adducts are clear, low viscosity liquids, generally light in color, and they are stable and show no tendency to crystallization. They are generally soluble in polar media such as methanol, ethanol, dimethylformamide, acetonitrile, dimethylsulphoxide, sulpholan, etc. and in low molecular weight polyols, e.g. with OH numbers from about 200 to 1800, such as are obtained, for example, by the addition of ethylene oxide to glycerol or trimethylolpropane. In quantities of up to about 50% by weight, however, they are also stable in storage in polyol mixtures of the kind used, for example, for the preparation of rigid polyurethane foam, and form monophasic, clear solutions therein. When used for the preparation of cellular polyurethanes according to the invention, they act as blowing agents, cross-linking agents and catalysts.

The following components are used for carrying out the process according to the invention.

As starting component (A): aliphatic, cycloaliphatic, araliphatic, aromatic and heterocyclic polyisocyanates such as those described, for example, by W. Siefken in Justus Liebigs Annalen der Chemie, 562, pages 75 to 136, for example those corresponding to the formula $Q(NCO)_n$ wherein
n=2–4, preferably 2, and
Q denotes an aliphatic hydrocarbon group having 4–18, preferably 6–10, carbon atoms,
a cycloaliphatic hydrocarbon group having 4–15, preferably 5–10, carbon atoms,
an aromatic hydrocarbon group having 6–15, preferably 6–13, carbon atoms,
or an araliphatic hydrocarbon group having 8–15, preferably 8–13, carbon atoms.

Examples include 1,4-tetramethylene, diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (German Auslegeschrift No. 1 202 785, U.S. Pat. No. 3,401,190), 2,4- and 2,6-hexahydrotolylene diisocyanate and any mixtures of these isomers, hexahydro-2,4'- and/or -4,4'-diphenylmethane diisocyanate, 1,3- and 1,4-phenylene diisocyanate, 2,4- and 2,6-tolylene diisocyanate and any mixtures of these isomers, diphenylmethane-2,4'- and/or 4,4'-diisocyanate, and naphthylene-1,5-diisocyanate.

The following, for example, may also be used according to the invention: triphenylmethane-4,4',4''-triisocyanate; polyphenyl-polymethylene polyisocyanates which may be obtained by aniline-formaldehyde condensation followed by phosgenation and have been described, for example, in British Pat. Nos. 874 430 and 848 671; m- and p-isocyanatophenylsulphonyl isocyanates according to U.S. Pat. No. 3,454,606; (perchloroinated aryl polyisocyanates as described, for example, in German Auslegeschrift No. 1 157 601 (U.S. Pat. No. 3,277,138); polyisocyanates containing carbodiimide groups as described in German Pat. No. 1 092 007 (U.S. Pat. No. 3,152,167) and in German Offenlegungsschriften Nos. 2 504 400, 2 537 685 and 2 552 350; norbornane diisocyanates according to U.S. Pat. No. 3,492,350; polyisocyanates containing allophanate groups as described e.g. in British Pat. No. 994 890, Belgian Pat. No. 761 626 and Netherlands Patent Application No. 7 102 524; polyisocyanates containing isocyanurate groups as described e.g. in U.S. Pat. No. 3,001,973, German Pat. Nos. 1 022 789, 1 222 067 and 1 027 394 and in German Offenlegungsschriften Nos. 1 929 034 and 2 004 048; polyisocyanates containing urethane groups as described e.g. in Belgian Pat. No. 752 261 or in U.S. Pat. Nos. 3,394,164 and 3,664,457; polyisocyanates containing acylated urea groups according to German Pat. No. 1 230 778; polyisocyanates containing biuret groups as described e.g. in U.S. Pat. Nos. 3,124,605, 3,201,372 and in British Pat. No. 889 050; polyisocyanates prepared by telomerization reactions as described in e.g. in U.S. Pat. No. 3,654,106; polyisocyanates containing ester groups as mentioned, for example, in British Pat. Nos. 965 474 and 1 072 956, U.S. Pat. No. 3,567,763 and German Pat. No. 1 231 688; reaction products of the above mentioned isocyanates with acetals according to German Pat. No. 1 072 385; and polyisocyanates containing polymeric fatty acid esters according to U.S. Pat. No. 3,455,883.

The distillation residues containing isocyanate groups from the commercial production of isocyanates may also be used, optionally dissolved in one or more of the above mentioned polyisocyanates. Any mixtures of the above mentioned polyisocyanates may also be used.

Aromatic polyisocyanates are preferably used and as a rule it is particularly preferred to use industrially readily available polyisocyanates such as 2,4- and 2,6-tolylene diisocyanate and any mixtures of these isomers ("TDI"), polyphenyl-polymethylene polyisocyanates such as may be prepared by anilineformaldehyde condensation followed by phosgenation ("crude MDI") and polyisocyanates containing carbodiimide groups, urethane groups, allophanate groups, isocyanurate groups, urea groups or biuret groups ("modified polyisocyanates"), in particular the modified polyisocyanates derived from 2,4- and/or 2,6-tolylene diisocyanate.

As starting component B(1): compounds containing at least two isocyanate reactive hydrogen atoms and generally having a molecular weight of from about 60 to 2000. These include compounds containing amino groups, thiol groups or carboxyl groups or preferably hydroxyl groups, in particular from 2 to 8 hydroxyl groups, especially those with molecular weights of from about 200 to 1000, preferably from about 300 to 800, e.g. polyesters, polyethers, polythioethers, polyacetals, polycarbonates and polyester amides having at least 2, generally 2 to 8, preferably 2 to 6 hydroxyl groups, such as the known compounds used for the preparation of both homogeneous and cellular polyurethanes. Polyether polyols are particularly preferred.

(a) Suitable polyesters containing hydroxyl groups include, for example, the reaction products of polyhydric, preferably dihydric alcohols with the optional addition of trihydric alcohols and polybasic, preferably dibasic carboxylic acids. Instead of using free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic and may be substituted, e.g. with halogen atoms, and/or unsaturated.

The following are examples of such carboxylic acids and their derivatives:
succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid and dimerized and trimerized unsaturated fatty acids optionally mixed with monomeric unsaturated fatty acids such as oleic acid, dimethylterephthalate and terephthalic acid-bis-glycol esters. Suitable polyhydric alcohols include e.g. ethylene glycol, propylene glycol-(1,2) and -(1,3), butylene glycol-(1,4), -(1,3) and -(2,3), hexanediol-(1,6), octanediol-(1,8), neopentyl glycol, 1,4-bis-hydroxymethylcyclohexane, 2-methyl-propane-1,3-diol, glycerol, trimethylolpropane, hexanetriol-(1,2,6), butanetriol-(1,2,4), trimethylolethane, pentaerythritol, quinitol, mannitol and sorbitol, formitol, methyl glycoside, diethylene glycol, triethylene glycol, tetraethylene glycol and higher polyethylene glycols, dipropylene glycol, and higher propylene glycols and dibutylene glycol and higher polybutylene glycols. The polyesters may contain a proportion of carboxyl end groups. Polyesters of lactones such as $\epsilon$-caprolactone or of hydroxycarboxylic acids such as $\omega$-hydroxycaproic acid may also be used.

(b) The hydroxypolyethers containing at least 2, generally 2 to 8, preferably 2 to 6 hydroxyl groups, which may also be used according to the invention and are in fact preferred, are known per se and may be prepared, for example, by the polymerization of epoxides such as ethylene oxide, propylene oxide, butylene oxide, tetrahydrofuran, styrene oxide or epichlorohydrin either on their own, e.g. in the presence of Lewis catalysts such as $BF_3$ or by their chemical addition, preferably the addition of ethylene oxide and propylene oxide, optionally as mixtures or successively, to starting components containing reactive hydrogen atoms, such as water, alcohols, ammonia or amines, for example the following: ethylene glycol, propylene glycol-(1,3) and -(1,2), trimethylolpropane, glycerol, sorbitol, mannitol, quinitol, trimethylolethane, pentaerythritol, hexanetriol-(1,2,6), 4,4′-dihydroxy-diphenylpropane, aniline, ethanolamine or ethylene diamine. Sucrose polyethers such as those described, for example, in German Auslegeschriften Nos. 1 176 358 and 1 064 938 and polyethers started on formitol or formose (German Offenlegungsschriften Nos. 2 639 083 and 2 737 951) may also be used according to the invention. It is frequently preferred to use polyethers containing predominantly primary OH groups (up to about 90% by weight thereof, based on all of the OH groups in the polyether).

(c) Polyester amides and polyamides, hydroxyl polycarbonates, polyacetals, polythioethers and polybutadienes of known type containing OH, NH and/or SH groups may also be used in the process according to the invention.

(d) Polyhydroxyl compounds already containing urethane or urea groups and modified or unmodified natural polyols such as castor oil or carbohydrates, e.g. starches, may also be used. Products of addition of alkylene oxides to phenol formaldehyde resins or to urea formaldehyde resins may also be used according to the invention.

(e) The starting components may also include compounds with molecular weights of from about 32 to 400 containing at least two isocyanate reactive hydrogen atoms. These are also compounds containing hydroxyl groups and/or amino groups and/or thiol groups and/or carboxyl groups, preferably hydroxyl groups and/or amino groups, and may be used as chain lengthening agents or cross-linking agents. These compounds generally contain from 2 to 8, preferably 2 to 4, isocyanate reactive hydrogen atoms.

These compounds with molecular weights of from about 32 to 400 containing at least two isocyanate reactive hydrogen atoms may also be used as mixtures of such compounds. The following are examples of such compounds:
ethylene glycol, propylene glycol-(1,2), and -(1,3), butylene glycol-(1,4), -(1,3) and -(2,3), pentanediol-(1,5), hexanediol-(1,6), octanediol-(1,8), neopentyl glycol, 1,4-bis-hydroxymethylcyclohexane, 2-methyl-1,3-propanediol, dibromobutenediol (U.S. Pat. No. 3,723,392), glycerol, trimethylolpropane, hexanetriol-(1,2,6), trimethylolethane, pentaerythritol, quinitol, mannitol and sorbitol, castor oil, diethylene glycol, triethylene glycol, tetraethylene glycol, higher polyethylene glycols with molecular weights of up to 400, dipropylene glycol, higher polypropylene glycols with molecular weights of up to 400, dibutylene glycol, higher polybutylene glycols with molecular weights of up to 400, 4,4′-dihydroxydiphenylpropane, dihydroxymethyl-hydroquinone, dihydroxyethyl-hydroquinone and dihydroxyethylresorcinol.

Low molecular weight polyols with molecular weights below 2000 used according to the invention may also be mixtures of hydroxyaldehydes and hydroxyketones ("formoses") and the polyhydric alcohols obtained from them by reduction ("formitol"), as obtainable by the autocondensation of formaldehyde hydrate and of compounds capable of enediol formation as co-catalysts (German Offenlegungsschriften Nos. 2 639 084, 2 714 084, 2 714 104, 2 721 186, 2 738 154 and 2 738 512).

(f) Low molecular weight polyols with molecular weights of up to 400 suitable for the purpose of the invention also include ester diols corresponding to the general formulae HO—(CH$_2$)$_x$—CO—O—(CH$_2$)$_y$—OH and HO—(CH$_2$)$_x$—O—CO—R—CO—O—(CH$_2$)$_x$—OH in which
R represents an alkylene group having 1–10, preferably 2 to 6 carbon atoms or a cycloalkylene or arylene group having 6 to 10 carbon atoms,
x=2 to 6 and
y=3 to 5,
e.g. δ-hydroxybutyl-ε-hydroxycaproic acid ester, ω-hydroxyhexyl-γ-hydroxybutyric acid ester, adipic acid-bis-(β-hydroxyethyl)-ester and terephthalic acid-bis-(β-hydroxyethyl)-ester;

diolurethanes corresponding to the general formula

HO—(CH$_2$)$_x$—O—CO—NH—R′—NH—CO—O—(CH$_2$)$_x$—OH wherein
R′ represents an alkylene group having 2–15, preferably 2–6, carbon atoms or a cycloalkylene or arylene group having 6–15 carbon atoms and
x represents a number from 2 to 6,
e.g. 1,6-hexamethylene-bis-(β-hydroxyethylurethane) or 4,4′-diphenylmethane-bis-(β-hydroxybutyl-urethane); and diol ureas corresponding to the general formula HO—(CH$_2$)$_x$—N—CO—NH—R″—NH—CO—N—(CH$_2$)$_x$—OH
           |                              |
           R‴                            R‴ wherein
R″ represents an alkylene group having 2–15, preferably 2–9, carbon atoms or a cycloalkylene or arylene group having 6–15 carbon atoms,
R‴ represents hydrogen or a methyl group and
x represents 2 or 3,
e.g. 4,4′-diphenylmethane-bis-(β-hydroxyethylurea) or the compound HO—CH$_2$—CH$_2$—NH—CO—NH—[cyclohexane ring with CH$_3$, CH$_3$, CH$_3$ substituents]—CH$_2$—NH—CO—NH—CH$_2$—CH$_2$—OH For some purposes, it is advantageous to use polyols containing sulphonate and/or phosphonate groups (German Offenlegungsschrift No. 2 719 372), preferably the adduct of bisulphite and butane-1,4-diol or its alkoxylation products.

The polyhydroxyl compounds mentioned above may be modified in various ways before they are put into the polyisocyanate polyaddition process. Thus according to German Offenlegungsschriften Nos. 2 210 839 (U.S. Pat. No. 3,849,515) and 2 544 195, a mixture of various polyhydroxyl compounds (e.g. a polyether polyol and a polyesterpolyol) may be condensed by etherification in the presence of a strong acid to form a relatively high molecular weight polyol consisting of various segments connected by ether bridges.

Amide groups may also be introduced into the polyhydroxyl compounds, for example, according to German Offenlegungsschrift No. 2 559 372, or triazine groups may be introduced by a reaction with polyfunctional cyanic acid esters according to German Offenlegungsschrift No. 2 620 487. Polyhydroxyl compounds containing guanidine, phosphonoformamide or acylurea groups are obtained by the reaction of a polyol with a less than equivalent quantity of a diisocyanato-carbodiimide followed by reaction of the carbodiimide group with an amine, amide, phosphite or carboxylic acid (German Offenlegungsschriften Nos. 2 714 289, 2 714 292 and 2 714 293). It is in some cases of particular interest to convert the relatively high molecular weight polyhydroxyl compounds completely or partly into the corresponding anthranilic acid esters by a reaction with isatoic acid anhydride, as described in German Offenlegungsschriften Nos. 2 019 432 and 2 619 840 and in U.S. Pat. Nos. 3,808,250, 3,975,428 and 4,016,143. Relatively high molecular weight compounds containing aromatic amino end groups are thus obtained.

To produce polymer products with improved flame resistance, these formoses are advantageously used in combination with aminoplast formers and/or phosphites (German Offenlegungsschriften Nos. 2 738 513 and 2 738 532). Solutions of polyisocyanate polyaddition products, in particular of polyurethane ureas containing ionic groups and/or polyhydrazodicarbonamides, in low molecular weight, polyhydric alcohols may also be used as polyol components according to the invention (German Offenlegungsschrift No. 2 638 759).

Polyhydroxyl compounds containing high molecular weight polyadducts or polycondensates or polymers in a finely dispersed or dissolved form may also be used according to the invention. Such polyhydroxyl compounds are obtained, for example, when polyaddition reactions (e.g. reactions between polyisocyanates and aminofunctional compounds) or polycondensation reactions (e.g. between formaldehyde and phenols and/or amines) are carried out in situ in the above mentioned hydroxyl compounds. Such processes have been described, for example, in German Auslegeschriften Nos. 1 168 075 and 1 260 142 and in German Offenlegungsschriften Nos. 2 324 134, 2 423 984, 2 612 385, 2 513 815, 2 550 796, 2 550 797, 2 550 833, 2 550 862, 2 633 293 and 2 639 253. Alternatively, according to U.S. Pat. No. 3,869,413 or German Offenlegungsschrift No. 2 550 860 a previously prepared aqueous polymer dispersion may be mixed with a polyhydroxyl compound and the water may then be removed from the mixture.

Polyhydroxyl compounds modified with vinyl polymers, e.g. the compounds obtained by the polymerization of styrene and acrylonitrile in the presence of polyethers (U.S. Pat. Nos. 3,383,351, 3,304,273, 3,523,093 and 3,110,695 and German Auslegeschrift No. 1 152 536) or in the presence of polycarbonate polyols (German Patent No. 1 769 795, U.S. Pat. No. 3,637,909) are also suitable for the process according to the invention. Polymer products with exceptional flame resistance are obtained when using polyether polyols which have been modified according to German Offenlegungsschriften Nos. 2 442 101, 2 644 922 and 2 646 141 and graft polymerization with vinyl phosphonic acid esters and optionally (meth)acrylonitrile, (meth)acrylamide or OH functional (meth)acrylic acid esters. Polyhydroxyl compounds into which carboxyl groups have been introduced by radical graft polymerization with unsaturated carboxylic acids and optionally other olefinically unsaturated monomers (German Offenlegungsschriften Nos. 2 714 291, 2 739 620 and 2 654 746) are particularly advantageously used in combination with mineral fillers.

When modified polyhydroxyl compounds of the type mentioned above are used as starting components in the polyisocyanate polyaddition process, the polyurethane products obtained in many cases have substantially improved mechanical properties.

Representatives of the above mentioned compounds to be used according to the invention have been described, for example, in High Polymers, Volume XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, publishers Carl-Hanser-Verlag, Munich, 1966, e.g. on pages 45–71.

Mixtures of the above mentioned compounds containing at least two isocyanate reactive hydrogen atoms and having molecular weights of from about 2000 to 12,000 may, of course, also be used, e.g. mixtures of polyethers and polyesters.

It is then in some cases particularly advantageous to use a combination of low melting and high melting polyhydroxyl compounds (German Offenlegungsschrift No. 2 706 297).

(g) Aliphatic polyamines suitable for the purpose of the invention, belonging to components B(1) or component B(2), depending upon their molecular weight, include, for example, ethylene diamine, 1,4-tetramethylene diamine, 1,11-undecamethylene diamine, 1,12-dodecamethylene diamine and mixtures of these compounds, 1-amino-3,3,5-trimethyl-5-aminomethylcyclohexane ("isophorone diamine"), 2,4- and 2,6-hexahydrotolylene diamine and mixtures thereof, perhydro-2,4'- and -4,4'-diaminodiphenylmethane, p-xylylene diamine, bis-(3-amino-propyl)-methylamine, diaminoperhydroanthracenes (German Offenlegungsschrift No. 2 638 731) and cycloaliphatic triamines according to German Offenlegungsschrift No. 2 614 244. Hydrazine and substituted hydrazines, e.g. methyl hydrazine, N,N'-dimethylhydrazine and their homologues and acid dihydrazides may also be used according to the invention, e.g. carbodihydrazide, oxalic acid dihydrazide, the dihydrazides of malonic acid, succinic acid, glutaric acid, adipic acid, β-methyladipic acid, sebacic acid, hydracrylic acid and terephthalic acid, semicarbazido-alkylene hydrazides such as β-semicarbazido-propionic acid hydrazide (German Offenlegungsschrift No. 1 770 591), semicarbazido alkylene carbazic esters such as 2-semicarbazido ethyl carbazic ester (German Offenlegungsschrift No. 1 918 504) or aminosemicarbazide compounds such as β-aminoethyl-semicarbazido carbonate (German Offenlegungsschrift No. 1 902 391). The amino groups may be partly or completely blocked by aldimine or ketimine groups to control their reactivity (U.S. Pat. No. 3,734,894, German Offenlegungsschrift No. 2 637 115).

According to German Offenlegungsschrift No. 2 546 536 and U.S. Pat. No. 3,865,791, relatively high molecular weight compounds containing amino end groups are obtained by a reaction of isocyanate prepolymers with hydroxyl-containing enamines, aldimines or ketimines followed by hydrolysis. Other methods of preparation of relatively high molecular weight compounds having amino groups or hydrazine groups in end positions are described in German Offenlegungsschrift No. 1 694 152 (U.S. Pat. No. 3,625,871).

In these compounds, the groups in end positions carrying the amino groups may also be attached to the polyether chain by urethane or ester groups. Preparation of these "aminopolyethers" is carried out in known manner. For example, amination of polyhydroxy polyethers such as polypropylene glycol ethers may be carried out by a reaction with ammonia in the presence of Raney nickel and hydrogen (Belgian Pat. No. 634 741). U.S. Pat. No. 3,654,370 describes the preparation of polyoxyalkylene polyamines by a reaction of the corresponding polyol with ammonia and hydrogen in the presence of a nickel, copper or chromium catalyst. The preparation of cyanoethylated polyoxypropylene ethers is described in German Pat. No. 1 193 671. Other methods for the preparation of polyoxyalkylene (polyether) amines are described in U.S. Pat. Nos. 3,155,728 and 3,236,895 and French Pat. No. 1 551 605. The preparation of polyethers containing secondary amino end groups, for example, is described in French Pat. No. 1 466 708.

Relatively high molecular weight polyhydroxyl polyethers may be converted into the corresponding anthranilic acid esters suitable as component (B) according to the invention by a reaction with isatoic acid anhydride, as described, for example, in German Offenlegungsschriften Nos. 2 019 432 and 2 619 840 and U.S. Pat. Nos. 3,808,250, 3,975,428 and 4,016,143. The polyethers obtained by this reaction contain aromatic amino end groups.

Other aminopolyethers within the above mentioned molecular weight range, for example those obtainable according to DE-OS 2 948 419, DE-OS 3 039 600 or EP 71 834 may also be used.

Examples of aromatic diamines include bisanthranilic acid esters according to German Offenlegungsschriften Nos. 2 040 644 and 2 160 590, 3,5- and 2,4-diamino-benzoic acid esters according to German Offenlegungsschrift No. 2 025 900, the diamines with ester groups described in German Offenlegungsschriften Nos. 1 803 635 (U.S. Pat. Nos. 3,681,290 and 3,736,350), 2 040 650 and 2 160 589, the diamines containing ether groups according to German Offenlegungsschriften Nos. 1 770 525 and 1 809 172 (U.S. Pat. Nos. 3,654,364 and 3,736,295), 2-halogen-1,3-phenylenediamine optionally substituted in the 5-position (German Offenlegungsschriften Nos. 2 001 772, 2 025 896 and 2 065 869), 3,3'-dichloro-4,4'-diaminodiphenylmethane, tolylene diamine, 4,4'-diaminodiphenylmethane, 4,4'-diamino-diphenyldisulphides (German Offenlegungsschrift No. 2 404 976), diaminodiphenyl dithioethers (German Offenlegungsschrift No. 2 509 404), aromatic diamines substituted by alkylthio groups (German Offenlegungsschrift No. 2 638 760), diaminobenzene phosphoric acid esters (German Offenlegungsschrift No. 2 720 166) and the high melting diamines mentioned in German Offenlegungsschrift No. 2 635 400. The aminoalkyl thioanilines according to German Offenlegungsschrift No. No. 2 734 574 are examples of aliphatic-aromatic diamines.

The chain lengthening agents used according to the invention may also be compounds such as 1-mercapto-3-aminopropane, substituted or unsubstituted amino acids such as glycine, alanine, valine, serine and lysine, and substituted or unsubstituted dicarboxylic acids such as succinic acid, adipic acid, phthalic acid, 4-hydroxyphthalic acid and 4-aminophthalic acid.

Compounds which are monofunctional in their reaction with isocyanates may also be included as so-called chain breakers in proportions of from about 0.01 to 10% by weight, based on the polyurethane solids content. Examples of such monofunctional compounds include monoamines such as butylamine and dibutylamine, octylamine, stearylamine, N-methylstearylamine, pyrrolidine, piperidine and cyclohexylamine, monohydric alcohols such as butanol, 2-ethylhexanol, octanol, dodecanol, various amyl alcohols, cyclohexanol and ethylene glycol monoethylethers.

Compounds belonging to component B(2) include (a) hydroxyl polyesters obtained from the same carboxylic acids and polyols as those mentioned above provided they have molecular weights above 2000, (b) polyether polyols obtained from the units described above, provided they have molecular weights above 2000, (c) polybutadienes, polythioethers, polyacetals, polycarbonates, polyester amides and polyamides of known type containing OH, NH and/or SH groups, provided they have molecular weights above 2000, and the types of compounds mentioned under B(1)(d), B(1)(e), B(1)(f), and B(1)(g), provided they have molecular weights above 2000.

The following are optionally used as auxiliary agents and additives B(4):

(a) Water and/or readily volatile inorganic or organic substances as blowing agents. Examples of organic blowing agents include acetone, ethyl acetate, halogen substituted alkanes such as methylene chloride, chloroform, ethylidene chloride, vinylidene chloride, monofluorotrichloromethane, chlorodifluoromethane and dichlorodifluoromethane, butane, hexane, heptane and diethylethers; suitable inorganic blowing agents include e.g. air, $CO_2$ and $N_2O$. The effect of a blowing agent may also be obtained by the addition of compounds which decompose at temperatures above room temperature with the release of gases (e.g. nitrogen), e.g. azo compounds such as azo dicarbonamide or azo isobutyric acid nitrile.

Further examples of blowing agents and details concerning the use of blowing agents may be found in Kunststoff-Handbuch, Volume VII, published by Vieweg and Höchtlen, Carl-Hanser-Verlag, Munich 1966, e.g. on pages 108 and 109, 453 to 455 and 507 to 510.

(b) Known types of catalysts, e.g. tertiary amines such as triethylamine, tributylamine, N-methylmorpholine, N-ethylmorpholine, N,N,N',N'-tetramethylethylenediamine, pentamethyl-diethylene triamine and higher homologues (German Offenlegungsschrift No. 2 624 527 and 2 624 528), 1,4-diaza-bicyclo-(2,2,2)-octane, N-methyl-N'-dimethylaminoethylpiperazine, bis-(dimethylcyclohexylamine, N,N-diethylbenzylamine, N,N-dimethylcyclohexylamine, N,N-diethylbenzylamine, bis-(N,N-diethylaminoethyl)-adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift No. 1 720 633), bis-(dialkylamino)-alkyl ethers (U.S. Pat. No. 3,330,782, German Auslegeschrift No. 1 030 558, German Offenlegungsschriften Nos. 1 804 361 and 2 618 280) and tertiary amines containing amide groups (preferably formamide groups) according to German Offenlegungsschriften Nos. 2 523 633 and 2 732 292. The known Mannich bases of secondary amines such as dimethylamine and aldehydes, preferably formaldehyde, or ketones such as acetone, methyl ethyl ketone or cyclohexanone and phenols such as phenol, nonlylphenol or bisphenol may also be used as catalysts.

Examples of tertiary amines with isocyanate reactive hydrogen atoms used as catalysts include triethanolamine, triisopropanolamine, N-methyl-diethanolamine, N-ethyldiethanolamine, N,N-dimethyl-ethanolamine and their reaction products with alkylene oxides such as propylene oxide and/or ethylene oxide as well as secondary-tertiary amines according to German Offenlegungsschrift No. 2 732 292.

Silaamines with carbon-silicon bonds may also be used as catalysts, e.g. the compounds described in German Pat. No. 1 229 290 (corresponding to U.S. Pat. No. 3,620,984), e.g. 2,2,4-trimethyl-2-silamorpholine and 1,3-diethylaminomethyl-tetramethyldisiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts (German Offenlegungsschrift No. 1 769 043).

The reaction between isocyanate groups and Zerewitinoff active hydrogen atoms is powerfully accelerated by lactams and aza lactams, an associate being first formed between the lactam and the compound containing acidic hydrogen. Such associates and their catalytic action are described in German Offenlegungsschriften Nos. 2 062 288, 2 062 289, 2 117 576 (U.S. Pat. No. 3,758,444), 2 129 198, 2 330 175 and 2 330 211.

Organic metal compounds may also be used as catalysts according to the invention, in particular organic tin compounds. Suitable organic tin compounds include compounds containing sulphur, such as di-n-octyl-tin mercaptide (German Auslegeschrift No. 1 769 367, U.S. Pat. No. 3,645,927), but the tin compounds used are preferably tin(II)-salts of carboxylic acids, such as tin-(II)-acetate, tin(II)-octoate, tin(II)-ethylhexoate and tin(II)-laurate and tin(IV)-compounds such as dibutyl tin oxide, dibutyl tin dichloride, dibutyl tin diacetate, dibutyl tin dilaurate, dibutyl tin maleate and dioctyl tin diacetate.

All the catalysts mentioned above may, of course, be used as mixtures. Combinations of organic metal compounds and amidines, aminopyridines and hydrazino pyridines are of particular interest (German Offenlegungsschriften Nos. 2 434 185, 2 601 082 and 2 603 834).

Other representatives of catalysts to be used according to the invention and details concerning the action of these catalysts are described in Kunststoff-Handbuch, Volume VII, published by Vieweg and Höchtlen, Carl-Hanser-Verlag, Munich 1966, e.g. on pages 96 to 102.

The catalysts are generally used in a quantity of from about 0.001 to 10% by weight, based on the total quantity of compounds containing at least two isocyanate reactive hydrogen atoms.

(c) Surface active additives such as emulsifiers and foam stabilizers. The emulsifiers used may be, for example, sodium salts of castor oil sulphonates or salts of fatty acids with amines, such as oleic acid diethylamine or stearic acid diethanolamine. Alkali metal or ammonium salts of sulphonic acids such as dodecylbenzene sulphonic acid or dinaphthylmethane disulphonic acid, or of fatty acids such as ricinoleic acid or of polymeric fatty acids may also be used as surface active additives.

The main foam stabilizers used are polyether siloxanes, especially those which are water-soluble. These compounds generally consist of a copolymer of ethylene oxide and propylene oxide linked to a polydimethyl siloxane group. Foam stabilizers of this kind have been described, for example, in U.S. Pat. Nos. 2,834,748, 2,917,480 and 3,629,308. Polysiloxanepolyoxyalkylene copolymers branched at allophanate groups according to German Offenlegungsschrift No. 2 558 523 are in many cases of particular interest.

(d) Reaction retarders, e.g. compounds which are acid in reaction, such as hydrochloric acid or organic acid halides; known cell regulators such as paraffins or fatty alcohols or dimethylpolysiloxanes, pigments, dyes and flame-retarders of known type such as trischloroethylphosphate, tricresylphosphate and ammonium phosphate and polyphosphate, stabilizers against aging and weathering, plasticizers and fungistatic and bacteriostatic substances and fillers such as barium sulphate, silica gel, carbon black or whiting may also be used.

Further examples of surface active additives and foam stabilizers optionally used according to the invention as well as cell regulators, reaction retarders, stabilizers, flame retarding substances, plasticizers, dyes, fillers and fungistatic and bacteriostatic substances and details concerning the use and action of these additives are described in Kunstoff-Handbuch, Volume VII, published by Vieweg and Höchtlen, Carl-Hanser-Verlag, Munich 1966, e.g. on pages 103 to 113.

Method of carrying out the process according to the invention:

The components are reacted together according to the invention by the known one-shot process, prepolymer process or semiprepolymer process, in many cases using mechanical devices such as those described in U.S. Pat. No. 2,764,565, for example. Details concerning processing apparatus suitable for the purpose of the invention may be found in Kunststoff-Handbuch, Volume VII, published by Vieweg and Höchtlen, Carl-Hanser-Verlag, Munich 1966, e.g. on pages 121 to 205.

Cold setting foams may also be produced by the process according to the invention (see British Pat. No. 1 162 517, German Offenlegungsschrift No. 2 153 086).

Foams may, of course, also be produced by block foaming or by the known laminator process.

For the purpose of the invention, it is preferred to produce the foams by the frothing process (see e.g. Kunststoff-Handbuch Volume VII, published by Vieweg and Höchtlen, Carl-Hanser-Verlag, Munich 1966, pages 455, 456, 509 and 534).

The polyurethane foams obtainable by the process according to the invention may be flexible, semi-rigid or rigid, the rigid foams being preferred. They may be used, for example, for insulating refrigerators, for the production of spray insulations and coatings and as one-component foams.

The invention is further illustrated, but is not intended to be limited by the following examples in which all parts and percentages are by weight unless otherwise specified.

EXAMPLES

Example 1

Comparison examples to DE-OS 2 200 480, Example 5 (page 17)

In this example, carbon dioxide was passed through a 20% weight per volume solution of ethanolamine in carbon tetrachloride.

When attempts were made to reproduce this experiment, it was found that at temperatures from 20° to 35° C., ethanolamine would not dissolve in carbon tetrachloride in amounts of 20% by weight nor 10% by weight nor 5% by weight (20, 10 and 5 parts of ethanolamine, respectively, and 80, 90 and 95 parts of tetrachloromethane). This experiment was therefore not reproducible.

Example 2

Comparison example to DE-PS 2 621 582, Example 4 (page 10)

In this example, it was asserted that a white, pulverulent diethanolamine carbamate was obtained by the introduction of carbon dioxide into a solution of diethanolamine in benzene.

When attempts were made to reproduce this experiment, it was found that diethanolamine was immiscible with benzene (and also with toluene) over a wide range of concentrations. When carbon dioxide was nevertheless introduced into such a diphasic mixture, no carbamate precipitated, nor any other solid substance and the components therefore remained in the form of a diphasic system. When, for example, carbon dioxide was introduced into a diphasic system of 100 ml of diethanolamine and 500 ml of benzene until saturation point was reached, and the resulting mixture was then decomposed with excess, dilute hydrochloric acid, 11.5 l of $CO_2$ were liberated, corresponding to an almost exactly equivalent ratio of amino groups to carbon dioxide of 2:1.

Example 3

Comparison example to GB 1 103 506, Example 9 (pages 5 and 6)

In this example, a salt was precipitated by the introduction of carbon dioxide into a solution of hydroxyethyl hydrazine in DMF.

When this experiment was repeated without solvent, i.e. carbon dioxide was introduced into hydrazinoethanol, and external cooling was applied to ensure that the reaction temperature did not exceed 80° C., 9.2 l of $CO_2$ (0.41 mol) were absorbed for every 100 g of hydrazinoethanol. Contrary to the previous description, the pale, clear product was liquid and did not crystallize even after prolonged storage.

The carbonic acid salt prepared with the addition of water was also liquid and did not crystallize (Example 6, 4).

Example 4

This example demonstrates the influence of the reaction temperature on the formation of the carbon dioxide adduct.

4.1 $CO_2$ was introduced into 122 g of ethanolamine (2 mol). The reaction temperature was maintained at 20° C. by external cooling and regulation of the speed at which $CO_2$ was introduced.

4.2 122 g of ethanolamine (2 mol) were heated to 80° C. and $CO_2$ was introduced. The reaction temperature was maintained at 80° C., first by cooling and towards the end of the reaction by heating.

4.3 122 g of ethanolamine (2 mol) at a temperature of 20° C. was gassed with carbon dioxide until saturation was reached. During this process, the temperature rose to 120° C. without cooling.

4.4 122 g of ethanolamine (2 mol) were heated to 140° C. and gassed with $CO_2$. The bath heated to 140° C. was not removed until saturation was reached. The temperature of the reaction mixture rose to 160° C. in the course of the reaction. The product had a distinct yellow color, in contrast to the polar products obtained in 4.1 to 4.3.

Clear, non-crystallizing liquids of medium viscosity were obtained from all four reaction mixtures.

The quantities of gas measured were virtually identical:

|      | Vol. 1 (l) | Vol. 2 (l) |
|------|-----------|-----------|
| 4.1. | 19.8      | 21.3      |
| 4.2. | 21.4      | 23        |
| 4.3. | 18.9      | 20.4      |
| 4.4. | 17.8      | 20.0      |
|      | ⌀ 19.5 l  | ⌀ 21.1 l  |

Volume 1 was the quantity of nitrogen obtained when taking an average of the quantities of $CO_2$ recorded on a gas meter and the quantities of $CO_2$ calculated from weighing the reaction mixture after it had been gassed with $CO_2$. Volume 2 was the quantity of gas determined volumetrically after the addition of excess dilute hydrochloric acid to the product.

It will be seen that the absorption of carbon dioxide was substantially independent of the reaction temperature; the quantity of $CO_2$ absorbed was always the same within the limits of error (approximately 1 mol of $CO_2$ to 2 mols of aminoalcohol).

4.5 3183 l (approximately 6.35 kg) of carbon dioxide were introduced into 21.6 kg of ethanolamine in the course of 7 hours with the reaction temperature rising from 20° C. to 85° C. The reaction mixture was cooled to prevent the reaction temperature from rising above 85° C. The pale, liquid material did not crystallize even after one year.

Example 5

This example investigates the storage stabilities of carbamates and carbonic acid adducts of ethanolamine.

5.1 The carbamates prepared in Example 4 and two carbonic acid salts prepared analogously to 4.1 and 4.2. (122 g of ethanolamine and 36 g of water) were heated to 80° C. for 2 hours. No evolution of gas could be ascertained either gravimetrically or volumetrically.

5.2 The carbamates prepared in Example 4 and two carbonic acid salts prepared analogously to 4.1. and 4.2. [from 122 g of ethanolamine (2 mol) and 36 g of water (2 mol) of $CO_2$ until saturation] were heated to 60° C. for 30 minutes at 20 mbar pressure and any loss of gas was ascertained by weighing and by acidolytic decomposition accompanied by $CO_2$ measurement.

No loss of gas could be ascertained in any of the 6 samples.

Example 6

Various other liquid carbon dioxide adducts were prepared in Example 6.

6.1 Ethanolamine-carbonic acid salt 800 g of a 98% ethanolamine (12.8 mol) and 120 g of water (16.67 mol) were combined and 138 l of $CO_2$ (6.16 mol) were introduced into the mixture in the course of one hour. The temperature of the mixture rose to 85° C. during the exothermic reaction. Cooling was provided to prevent the temperature from rising above this level.

In another experiment using the same quantity of reaction mixture, 144 l of $CO_2$ (6.43 mol) were absorbed.

The product obtained is a clear liquid from which no carbon dioxide was released. It was stable for at least one year.

6.2 Diethanolamine-carbon dioxide adducts

6.2.1. Diethanolamine carbonic acid salt

Carbon dioxide was introduced into a mixture of diethanolamine (900 g=8.57 mol) and 80 g of water (4.44 mol) until saturation. In the course of 75 minutes, 73 l of $CO_2$ (3.26 mol) were introduced into one sample and 72 l (3.21 mol) into another sample. The reaction temperature rose to 63° C. without cooling.

6.2.2. Diethanolamine carbamate 78 l of $CO_2$ (3.48 mol) (saturation) were introduced into 1000 g of diethanolamine (9.52 mol), the reaction temperature rising from 25° C. to 70° C.

The clear liquid product had no tendency to crystallize or evolve gas and was stable for at least one year.

6.3. N-hydroxyethylethylenediamine carbonic acid salt 6.3.1. 238 l of carbon dioxide (10.63 mol) (saturation limit) were introduced in the course of 150 minutes into a mixture of 1400 g of N-$\beta$-hydroxyethylethylene diamine and 242 g of water (13.46 mol each). The reaction temperature rose to 80° C.

6.3.2. $CO_2$ was introduced to saturation point into a mixture of 400 g of N-$\beta$-hydroxyethylethylene diamine (3.85 mol) and 88 ml of water (4.89 mol) while the mixture was cooled with ice to prevent the reaction temperature rising above 25° C. 130 l of $CO_2$ (5.8 mol) were absorbed.

6.3.3. N-hydroxyethylethylenediamine-carbamate

Carbon dioxide was introduced until saturation into 1000 g of N-hydroxyethylethylenediamine, and the reaction temperature rose from 25° C. to 70° C. 119 l of $CO_2$ (5.3 mol) were absorbed. The clear liquid products had no tendency to crystallize or evolve gas and were stable for at least one year.

6.4. Hydrazinoethanol carbonic acid salt

Carbon dioxide was introduced until saturation into a mixture of 500 g of hydrazinoethanol (6.58 mol) and 59 g of water (3.29 mol). 49.5 l of carbon dioxide (2.2 mol) were absorbed while the temperature rose to 83° C.

The clear liquid product had no tendency to crystallize or evolve gas and was stable for at least one year.

6.5. Isopropanolamine-carbon dioxide adducts

6.5.1. Isopropanolamine carbamate 55 l of carbon dioxide (2.46 mol) were introduced in the course of 2 hours into 500 g of isopropanolamine. The temperature rose to 62° C.

The clear, rather more viscous product had no tendency to crystallize or evolve gas and was stable for at least one year.

6.5.2. Isopropanolamine carbonic acid adduct

Carbon dioxide was introduced until saturation into a mixture of isopropanolamine (500 g=6.7 mol) and 120 g of water (6.67 mol). 99.2 l of $CO_2$ (4.4 mol) were absorbed.

6.6. N-methyldiethanolamine carbonic acid salt

Carbon dioxide was introduced into a mixture of 305.5 g of N-methyldiethanolamine (2.28 mol) and 47 g of water (1.68 mol) while the mixture was cooled with ice. 33.7 g of $CO_2$ (0.74 mol) had been absorbed at this temperature after 3 days.

The clear liquid product was stable for at least three years, did not crystallize and did not release any gas.

Examples of practical application

Polyols used in the process

Polyol (A): Polyether polyol with OH number about 380, functionality 5.8 and viscosity 12,000 mPas at 25° C., obtained by propoxylation of a mixture of cane sugar (87.4% of OH equivalents), water (6.2%) and propylene glycol (6.4%).

Polyol (B): Polyether polyol with OH number about 380, functionality 3 and viscosity 600 mPas at 25° C. obtained by propoxylation of a mixture of cane sugar (45%), water (2%) and propylene glycol (53%).

Polyol (C): Polyether polyol with OH number about 470, functionality 2 and viscosity 85 mPas at 25° C., obtained by ethoxylation of ethyl diethanolamine.

Polyol (D): Polyether polyol with OH number about 470, functionality 5.3 and viscosity about 34,000 mPas at 25° C. obtained by propoxylation of a mixture of cane sugar (82.8%), water (3.1%) and propylene glycol (14.1%).

Polyol (E): Polyether polyol with OH number about 380, functionality 3 and viscosity 1500 mPas at 25° C. obtained by propoxylation of a mixture of cane sugar (45%) and propylene glycol (55%).

Polyol (F): Polyether polyol with OH number about 455, functionality 3 and viscosity 400 mPas at 25° C., obtained by propoxylation of glycerol.

Polyol (G): Polyether glycol with OH number about 650, functionality 4 and viscosity about 20,000 mPas at 25° C., obtained by propoxylation of ethylene diamine.

Polyol (H): Polyether polyol with OH number 35 and functionality 3 obtained by blockwise addition of propylene oxide to trimethylol propane.

Polyol (I): Polyether polyol with OH number about 500 and functionality 3, obtained by propoxylation of triethanolamine.

Example 7

Use of the carbon dioxide adducts in rigid foam 7.1 Use of carbamate compounds

Formulation:
- 60 parts of polyol D
- 23.6 parts of polyol B
- 16.4 parts of polyol E
- 2.1 parts of water
- 1.9 parts of cell stabilizer (80% solution of a polyether siloxane in a polypropylene glycol having an OH number of 500)
- 3.3 parts of amine catalyst 1 (Desmorapid catalyst: Sample PU 3144 of BAYER AG)
- x parts of carbamate compound
- x parts of amine catalyst 2 (Desmorapid catalyst: 726 b of BAYER AG)

Various quantities of different carbamates were added to 100 parts of the polyol formation (OH number about 430) and the formulation was reacted using various quantities of amine catalyst 2.

| Parts | Carbamate (from Example) | Parts of amine catalyst 2 | Cream time (sec.) | Gel time (sec.) |
|---|---|---|---|---|
| 0 |  |  | 23 | 104 |
| 1 | 4.5. | 1.1 | 15 | 104 |
| 2 | 4.5. | 0.9 | 7 | 107 |
| 3 | 4.5. | 0.9 | 4 | 105 |
| 4 | 4.5. | 0.8 | 3 | 100 |
| 3 | 6.2.2. | 0.5 | 11 | 106 |
| 3 | 6.3.3. | 1.8 | 18 | 105 |
| 3 | 6.5. | 1.1 | 4 | 104 |

The polyol mixtures containing carbamates and catalysts were mixed with 40 parts of trichlorofluoromethane with vigorous stirring. An isocyanate index of 105 was maintained while the mixture was foamed up with 150 parts of an isocyanate consisting of a crude phosgenation product of an aniline-formaldehyde condensate from which diisocyanatodiphenylmethane was distilled off in the quantity required to leave a residue having a viscosity of 200 mPas at 25° C., a dinuclear content of 44.3%, a trinuclear content of 23.5% and a higher nuclear content of polyisocyanates of 32.2%. The NCO content was about 31% by weight.

7.2 Use of carbonic acid compounds:

When another batch of reaction mixture 7.1. was prepared but the carbamates from Examples 4.5, 6.3.3., 6.5. and 6.2.2. were replaced by the corresponding carbonic acid compounds from Examples 6.1., 6.2.1., 6.5.2. and 6.3.2., the foaming characteristics were found to be the same as those obtained with the carbamates. This is true whether or not the water content of the carbonic acid salts was considered in the formulation. There was found to be no difference between carbamates and carbonic acid salts as regards the kinetic foaming data and the appearance, behavior, etc. of the foam.

Example 8

Ethanolamine-carbon dioxide adducts in rigid foam
8.1. Use of ethanolamine carbamate
Formulation:
  80 parts of polyol A
  12 parts of polyol B
  8 parts of polyol C
  0.5 parts of dimethylethanolamine
  2.1 parts of water
  1.5 parts of stabilizer (as in 7.1.)

Various quantities of ethanolamine carbamate (from 4.5.) were added to 100 parts of the polyol formulation (OH number about 380) and the reaction mixture was reacted using amine catalyst 2 as in Example 7. After the addition of 38 parts of trichloromonofluoromethane, the mixture was reacted with 130 parts of the isocyanate from Example 7.1..

All mixing was carried out with a laboratory stirrer at 1000 revs/min.

| Parts of carbamate | Parts of amine catalyst 2 | Cream time (sec.) | Gel time (sec.) |
|---|---|---|---|
| 0 | 1.5 | 16 | 85 |
| 1 | 1.2 | 10 | 84 |
| 2 | 1.0 | 5 | 83 |
| 3 | 0.8 | 4 | 87 |
| 4 | 0.7 | 3 | 88 |
| 5 | 0.7 | 2 | 82 |

Formulations containing more than 2 parts of ethanolamine carbamate were difficult to work up in the laboratory because of the foaming effect. When polyol mixtures containing 3 or more parts of ethanolamine carbamate were foamed up in a high pressure machine (HK 100 of Maschinenfabriken Hennecke, St. Augustin, Federal Republic of Germany, using a needle nozzle mixing head), the reaction mixture was already foamed up as it left the outlet tube and formed a froth of the kind which is otherwise only observed when about 5 to 8 parts of dichlorodifluoromethane or similar low boiling substances are added.

8.2. Use of ethanolamine carbonic acid salt

When another batch of formulation 8.1. was prepared for use with ethanolamine carbonic acid salt (from Example 4.5.) and the quantitative proportions were varied in the same manner, no difference was found between the ethanolamine carbamate and the carbonate. This is equally true whether or not the water content of the carbonic acid salt has been considered in the formulation.

Example 9

Another example of using carbon dioxide salts in rigid foam
9.1. Use of carbamates
Formulation:
  60 parts of polyol D
  30 parts of polyol F
  10 parts of polyol G
  2 parts of water
  2 parts of a siloxane polyether copolymer with viscosity η700 mPas at 25° C.
  0.5 parts of amine catalyst 3, (Desmorapid PV of BAYER AG)

100 parts of polyol formulation were mixed with 3 parts of ethanolamine carbamate (from 4.5.), diethanolamine carbamate (from 6.2.1.) and isopropanolamine carbamate (from 6.5.2.) and activated with amine catalyst 2. After addition of 35 parts of trichlorofluoromethane, the mixture was reacted with 148 parts of the polyisocyanate from Example 7.1.

|  | Parts of amine Catalyst 2 | Cream time (sec.) | Gel time (sec.) |
|---|---|---|---|
| 3 parts of ethanolamine carbamate (from 4.5.) | 3 | 4 | 76 |
| 3 parts of diethanolamine carbamate (from 6.2.2.) | 3 | 7 | 76 |
| 3 parts of isopropanolamine carbamate (from 6.5.1.) | 3 | 4 | 82 |
| — | 0 | 12 | 75 |

9.2. Use of carbonic acid salt

When another batch of formulation 9.1. was prepared and the carbamates from Examples 4.5., 6.2.2., and 6.5.1. were replaced by the corresponding carbonates from Examples 6.1., 6.2.1., and 6.5.2., the foaming characteristics were found to be the same as those obtained with the carbamates, regardless of whether or not the water content of the carbonic acid salts in the formulation has been considered. No difference can be found between carbamates and carbonates (carbonic acid salts) as regards the kinetic foaming data, appearance, behavior, properties, etc. of the foam.

Examples 7.1.–9.2. demonstrate that carbamates and (bi)carbonates show the same behavior when foaming is carried out within the given concentration ratio. Both types of compounds, when added to the formulations, give rise to the formation of a froth of the kind normally observed only when a substance such as dichlorodifluoromethane, for example, is used. Moreover, the foams obtained are found to have much fewer bubbles and signs of roll-back than systems processed with dichlorodifluoromethane.

Example 10

Investigation of storage stability 100 parts of the polyol system from Example 8.1. were mixed with 3 parts of ethanolamine carbamate (from Example 4.5.) and stored at 25° C.

| | Foaming after | | | | | | |
|---|---|---|---|---|---|---|---|
| | instantly | 7 d | 14 d | 35 d | 70 d | 105 d | 0.5 year |
| Cream time (sec.) | 4 | 4 | 4 | 4 | 4 | 4 | 4 |
| Gel time (sec.) | 78 | 77 | 77 | 76 | 78 | 78 | 80 |

No change in the reaction times, frothing effect and quality of the foam could be observed even after 6 months' storage.

Example 11

Investigations into storage stability 100 parts of the polyol system from Example 8.1. were mixed with 3 parts of ethanolamine carbamate (from Example 4.5.) and 1.3 parts of amine catalyst 2 from Example 7 and stored at 60° C.

| | Foaming after | | | | |
|---|---|---|---|---|---|
| | instantly | 4 d | 7 d | 14 d | 28 d |
| Cream time (sec.) | 4 | 4 | 4 | 4 | 4 |
| Gel time (sec.) | 83 | 83 | 83 | 83 | 83 |

No change in reaction times, frothing or quality of the foam could be observed after one month's storage.

Example 12

Formulation for semi-rigid polyurethane foam 12.1 Comparison
  101 parts of polyol H
  9 parts of ethylene glycol
  0.4 parts of triethylene diamine
  0.1 parts of water
  0.1 parts of a foam stabilizer based on a polyether polysiloxane copolymer (DC 193 of Dow-Corning)
  14 parts of trichlorofluoromethane
  100 parts of this polyol component were reacted with 45 parts of a polyisocyanate having an isocyanate content of 27 to 29% by weight and a viscosity of 130±30 mPas at 25° C., which polyisocyanate had been obtained by partial urethanization of a crude phosgenation product of an aniline/formaldehyde condensate from which diisocyanatodiphenylmethane had been distilled off in the quantity required to produce a distillation residue having a viscosity of 100 mPas at 25° C., a dinuclear content of 59.7%, a trinuclear content of 21.3% and a higher nuclear polyisocyanate content of 19.0%, using a polypropylene glycol with OH number about 507.

12.2. (according to the invention)
  Formulation:
    101 parts of polyol H
    5 parts of ethylene glycol
    0.4 parts of triethylene diamine (Dabco catalyst)
    14 parts of trichlorofluoromethane
    0.1 parts of foam stabilizer according to Example 12.1.
    5 parts of carbonate composition A
  100 parts of this polyol component were foamed up with 47 parts of the isocyanate from 12.1.

Carbonate composition A

Carbon dioxide was introduced into a mixture of 500 parts of ethanolamine, 500 parts of polyol I and 75 parts of water at a reaction temperature which rose from 20° C. to 68° C. 88.5 l of $CO_2$ were taken up. The pale yellowish, clear product was a stable monophasic substance.

12.3. (according to the invention)
  Formulation:
    101 parts of polyol H
    5 parts of ethylene glycol
    0.4 parts of triethylene diamine (Dabco catalyst)
    14 parts of trichlorofluoromethane
    0.1 part of foam stabilizer according to Example 12.1.
    5 parts of carbonate composition B
  100 parts of this polyol component were foamed up with 41 parts of the isocyanate from 12.1.

Carbonate composition B

Carbon dioxide was introduced to saturation into a mixture of 500 parts of diethanolamine, 500 parts of polyol I and 40 parts of water at 60° C. 32 l of $CO_2$ were taken up. The yellowish product was a clear, monophasic liquid and was stable in this form.

| Comparison of 12.1., 12.2. and 12.3. (free foams) | | | | |
|---|---|---|---|---|
| Example | Cream time (sec.) | Rise time (sec.) | Gel time (sec.) | Unit weight (kg/m$^3$) |
| 12.1. | 20 | 48 | 50 | 146.5 |
| 12.2. | 18 | 65 | 70 | 118 |
| 12.3. | 14 | 70 | 80 | 123 |

The carbonate products accelerated the starting phase to creaming and increased the viscosity of the reaction mixture during this phase. The carbonate products of this example also had a cell opening effect.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a cellular polyurethane which comprises reacting
(A) a polyisocyanate with
(B) an isocyanate-reactive component containing
   (1) at least one component in the molecular weight range of from about 60 to 2000 containing isocyanate-reactive groups and having a functionality of 2 to 8,
   (2) optionally at least one component in the molecular weight range of from about 2000 to 12000 containing isocyanate-reactive groups and having a functionality of 2 to 8,
   (3) about 0.1–30 parts, based on 100 parts of B(1)+B(2), of a liquid adduct of an amine and carbon dioxide, and
   (4) optionally water, blowing agents, foam stabilizers, catalysts and other auxiliary agents and additives,
wherein the liquid amine-carbon dioxide adduct is a liquid adduct at 20° C., optionally containing water, based on carbon dioxide and an amine which has at least one amino group and contains at least one primary, secondary or tertiary hydroxyl group, which amine is solid or liquid at 20° C.

2. The process according to claim 1, characterized in that the liquid amine-carbon dioxide adduct is obtained by the action of carbon dioxide on the amine, optionally in the presence of water and/or polyols with an OH number above 112 having 2 to 8 hydroxyl groups, in the absence of solvents of the type of aliphatic halogenated hydrocarbons, optionally nitrated or halogenated, optionally alkyl group-containing aromatic hydrocarbons, lower aliphatic alcohols, acid amides, lactams and aprotic solvents, at temperatures of from about −25° C. to 160° C.

3. Process according to claim 1, characterized in that the liquid amine-carbon dioxide adduct has
   (a) a basic nitrogen content of about 19 to about 3.5% by weight,
   (b) a hydroxyl group content of about 27.5 to about 8.5% by weight,
   (c) a carbon dioxide content of about 42 to about 1.0% by weight and
   (d) a water content from 0 to about 15% by weight.

4. The process according to claim 1, characterized in that the liquid amine-carbon dioxide adduct is a carbonate and/or bicarbonate, liquid at 20° C., of an amine having at least one primary, secondary or tertiary amino group and containing at least one primary, secondary or tertiary hydroxyl group, which amine is solid or liquid at 20° C., and in that it has
   (a) a basic nitrogen content of about 17 to about 3.5%,
   (b) a hydroxyl group content of about 20.5 to about 8.5%,
   (c) a carbon dioxide content of about 36% to about 2.5% by weight and
   (d) a water content of about 3 to about 15% by weight.

5. The process according to claim 4, characterized in that said liquid amine-carbon dioxide adducts are carbonates or bicarbonates of N-mono-, N,N-di- and N,N,N-tri-($\beta$-hydroxyalkyl)-amines and N-mono-, N,N'-di- and N,N',N'-tri-($\beta$-hydroxyalkyl)-ethylenediamine.

6. The process according to claim 5, characterized in that said liquid amine-carbon dioxide adducts are carbonates or bicarbonates of ethanolamine, diethanolamine, propanolamine, isopropanolamine, diisopropanolamine and N-hydroxyethylethylenediamine.

7. The process according to claim 1, characterized in that the polyisocyanates used are optionally modified tolylene diisocyanates or phosgenation products of aniline/formaldehyde condensates.

8. The process according to claim 6, characterized in that the polyisocyanates used are optionally modified tolylene diisocyanates or phosgenation products of aniline/formaldehyde condensates.

9. The process according to claim 1, characterized in that polyethers with a molecular weight of from 200 to 1000 containing 3–6 hydroxyl groups are used as component B(1).

10. The process according to claim 6, characterized in that polyethers with a molecular weight of from 200 to 1000 containing 3–6 hydroxyl groups are used as component B(1).

11. The process according to claim 7, characterized in that polyethers with a molecular weight of from 200 to 1000 containing 3–6 hydroxyl groups are used as component B(1).

12. The process according to claim 8, characterized in that polyethers with a molecular weight of from 200 to 1000 containing 3–6 hydroxyl groups are used as component B(1).

* * * * *